United States Patent [19]

Izawa et al.

[11] 4,224,046
[45] Sep. 23, 1980

[54] METHOD FOR MANUFACTURING AN OPTICAL FIBER PREFORM

[75] Inventors: Tatsuo Izawa, Musashino; Toru Kuwabara, Yokohama; Yuichi Masuda, Yokohama; Yuji Kameo, Yokohama, all of Japan

[73] Assignees: Nippon Telegraph and Telephone Public Corporation, Tokyo; Sumitomo Electric Industries, Ltd., Osaka, both of Japan

[21] Appl. No.: 932,968

[22] Filed: Aug. 11, 1978

[30] Foreign Application Priority Data

Aug. 11, 1977 [JP] Japan .................................. 52-96735

[51] Int. Cl.³ ...................... C03B 19/06; C03B 37/075
[52] U.S. Cl. ......................................... 65/3 A; 65/18; 65/2
[58] Field of Search ................ 65/3 A, 2, 18, 121, 65/144; 264/81

[56] References Cited

U.S. PATENT DOCUMENTS

| 3,303,115 | 2/1967 | Nitsche | 65/3 A X |
|---|---|---|---|
| 3,737,293 | 6/1973 | Maurer | 65/3 A |
| 3,785,718 | 1/1974 | Gloge | 65/3 A X |
| 3,823,995 | 7/1974 | Carpenter | 65/3 A X |
| 3,957,474 | 5/1976 | Kobayashi et al. | 65/3 A |
| 4,017,288 | 4/1977 | French et al. | 65/3 A X |
| 4,042,404 | 8/1977 | Schultz | 65/3 A X |
| 4,062,665 | 12/1977 | Izawa et al. | 65/3 A |
| 4,065,280 | 12/1977 | Kao et al. | 65/3 A |
| 4,099,835 | 7/1978 | French et al. | 65/3 A X |
| 4,135,901 | 1/1979 | Fujiwara et al. | 65/3 A X |

FOREIGN PATENT DOCUMENTS 2605483  8/1977  Fed. Rep. of Germany ........... 65/3 A Primary Examiner—Richard V. Fisher
Attorney, Agent, or Firm—Sughrue, Rothwell, Mion, Zinn and Macpeak

[57] ABSTRACT

Two gaseous raw glass materials containing dopants to provide different refractive indices and borne by an argon carrier are jetted from the central or inner and first concentric nozzles 11, 12 of a five tip burner 1; an argon shield is supplied through the second concentric nozzle 13, and hydrogen and oxygen are supplied through the third and fourth concentric nozzles 14, 15, respectively. Soot-like glass particles 4 are formed by flame hydrolysis and deposited on the lower end of a start rod 3 which is gradually rotated and withdrawn to thus grow a cylindrical preform 2. The intermixing of the particles formed from the two glass materials produces a preform having a substantially parabolic radial index of refraction distribution, which characteristic is retained in an optical communication fiber formed by sintering and drawing the preform.

7 Claims, 6 Drawing Figures

REFRACTIVITY DISTRIBUTION OF RAW GAS

METHOD FOR MANUFACTURING AN OPTICAL FIBER PREFORM

BACKGROUND OF THE INVENTION

This invention relates to a method and apparatus for manufacturing a glass rod preform from which an optical light transmitting fiber can be drawn.

An optical communication fiber comprises a central core glass section and a surrounding cladding glass section having a lower refractive index than that of the core glass section. Such light transmitting glass fibers are broadly classified as either a step index type in which the radial refractive index distribution varies in a stepwise manner across the fiber, or a graded index type in which the distribution is parabolic.

A glass rod which can be drawn into a thin glass fiber is called a "preform", which also comprises the core glass and cladding glass sections. One method of manufacturing such preforms is disclosed in U.S. Pat. No. 3,823,995, in which a start member having a circular cross section is first prepared, and then glass "soot" particles made from raw glass gaseous materials by flame hydrolysis are laminated on the surface of the start member as it is being rotated. In this operation various dopants in addition to quartz glass are added to the laminated glass to vary its refractive index. The amounts of dopants are controlled for every layer of glass so that the resulting preform has a predetermined refractive index distribution. Thus, if the glass particles are first laminated with a constant dopant concentration, and the latter is then changed to abruptly decrease the refractive index, the resulting preform is of the step index type; if the dopant concentration is gradually changed so that the refractive index is decreased for each laminated layer, then a graded index type of preform is obtained. The soot-like glass lamina thus obtained is then placed in a high temperature furnace which renders it transparent, and the start member is thereafter removed. Only the cylindrical glass part is heated, and the hollow inner part is collapsed to form the preform.

Another conventional method is disclosed in U.S. Pat. No. 3,737,293, in which gaseous raw glass materials are successively coated on the inner wall of a quartz tube while it is being rotated and heated. In this method the dopant concentration is also controlled for each layer so that the final preform has a predetermined refractive index distribution. It is thereafter heated at a high temperature and the hollow part is collapsed to obtain the preform.

The above-described conventional methods are disadvantageous, however, in the following respects. In the method of U.S. Pat. No. 3,823,995, since the thermal expansion coefficient of the start member is different from that of the laminated glass, the laminated glass is liable to crack as a result of slight temperature variations or impacts during the forming process. In the method of U.S. Pat. No. 3,737,293, the length, diameter and wall thickness of the quartz start tube is limited, and therefore it is impossible to obtain a large preform.

U.S. Pat. No. 4,135,901 to Fujiwara et al discloses a preform manufacturing method which is completely different from the above-described methods. In the Fijiwara et al method a plurality of nozzles or burners jet gaseous raw glass materials toward a rotating start substrate or toward one end face of a rotating start member. The nozzles or burners are disposed parallel with the start member rotation axis or form an angle therewith so that the raw glass materials are oxidized or hydrolyzed in a high temperature atmosphere to synthesize glass particles. The glass particles are deposited on the start substrate or on the tip end of the rod-shaped start member, and are laminated in the direction of the rotation axis to thereby obtain the preform. In this method the dopant compositions in the gaseous raw glass material jetted by the plurality of nozzles or burners are controlled such that the refractive index of the central glass laminates close to the rotational axis of the rod are higher than those of the laminates more remote from the rotational axis. This method is not affected by the start member and is suitable for manufacturing large preforms.

Two important characteristics are required with respect to the transmitting surface of a light communication fiber. One is that the optical transmission loss be low. The other is that the transmitted light pulse waveform deformation and pulse width variations be minimal during transmission. The latter characteristic means that a wide transmission band of a base band frequency with a low loss is required. As the refractive index distribution of the fiber approaches a parabola the transmission band width of the base band frequency is increased. In general, there are three factors which increase the optical transmission loss. The first is the scattering of light which is caused by refractive index variations in the axial direction. The second is light absorption due to the presence of impurities and the third is the scattering of light which is caused by structural imperfections due to core diameter variations in the longitudinal direction.

With respect to the two above-described transmission characteristics, the method of U.S. Pat. No. 4,135,901 has certain disadvantages. For example, with a plurality of nozzles or burners, even if the start substrate or rod-shaped start member is rotated during the glass lamination process, the laminated dopant distribution is not completely uniform in the circumferential direction. Consider the case where the axis of a burner for synthesizing the core glass is positioned in coincidence with the rotational axis of the start member. In general, the volume or amount of glass laminated is 20–50 g/hour. If the lamination is carried out at a rate of 36 g/hour, or 0.01 g/sec., and this is converted into a fiber 150 $\mu$m in diameter, then the amount of glass laminated corresponds to a fiber produced at a rate of 25 cm/sec. If the substrate or start member is rotated during the laminating process at one revolution per second, then any variation in the refractive index of the fiber will have a period of 25 cm/sec. since the dopant jetted by the burner for the cladding glass is spirally distributed with a period of 25 cm/sec. The same result is obtained even if another cladding glass burner is symmetrically disposed with respect to the rotational axis, and the problem cannot be solved by merely arranging a plurality of nozzles. The resulting non-uniformity of the refractive index in the axial direction increases the transmission loss.

The fact that the refractive index distribution varies spirally and periodically means that such distribution on any given section of the fiber does not have circular symmetry. That is, none of the refractive index distributions are identical or constant on straight lines parallel to the central axis of the preform, which reduces the transmission band width of a graded index type of fiber.

Another disadvantage accompanying the use of a plurality of nozzles or burners is that the number of gases to be controlled is increased, and therefore the apparatus is necessarily bulky and intricate and it is difficult to manufacture preforms with high reproducibility or consistency.

SUMMARY OF THE INVENTION

Accordingly, an object of this invention is to eliminate the above drawbacks by using, instead of a plurality of burners, only a single burner having coaxially arranged multiple pipes for forming the light propagating section of an optical fiber.

Briefly, and in accordance with the present invention, two gaseous raw glass materials containing dopants to provide different refractive indices and borne by an argon carrier are jetted from the inner and first concentric nozzles of a five tip burner; an argon shield is supplied through the second concentric nozzle, and hydrogen and oxygen are supplied through the third and fourth concentric nozzles, respectively. Soot-like glass particles are formed by flame hydrolysis and deposited on the lower end of a start rod which is gradually rotated and withdrawn to thus grow a cylindrical preform. The intermixing of the particles formed from the two glass materials produces a preform having a substantially parabolic radial index of refraction distribution, which characteristic is retained in an optical communication fiber formed by sintering and drawing the preform.

DETAILED DESCRIPTION OF THE PREFERRED EMBODIMENTS

Figure 1:
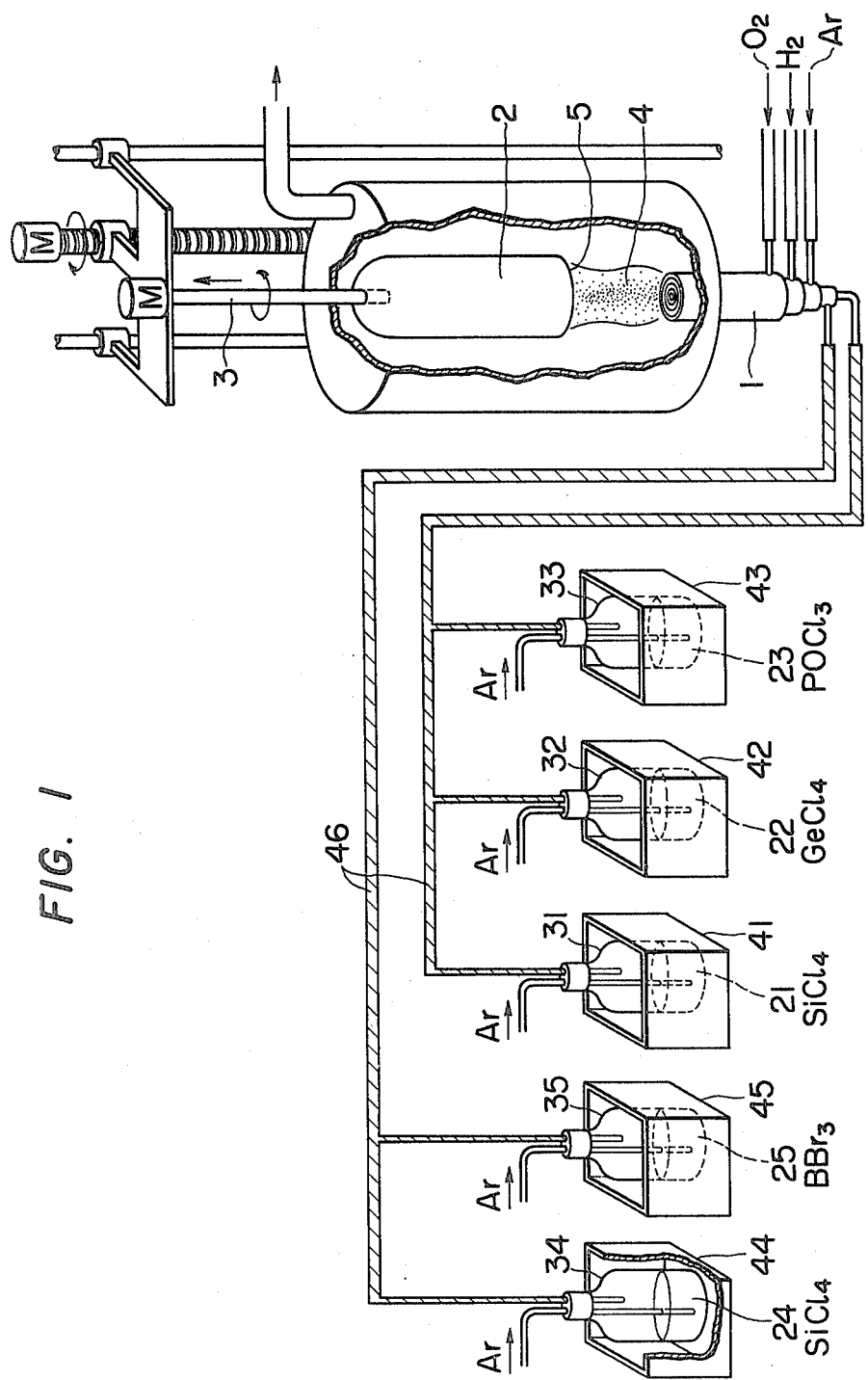
FIG. 1 shows a schematic perspective, partly cutaway, of an apparatus for making a graded index preform according to the present invention.

Referring now to the drawings, a first raw glass material adapted to increase the refractive index is jetted out of the central nozzle 11 of a quartz glass burner 1, with argon as the carrier gas. This gaseous raw glass material is $SiCl_4$, and $GeCl_4$ and $POCl_3$ are employed as dopant gases to increase the refractive index. The $POCl_3$ dopant not only increases the refractive index, but also controls the thermal expansion coefficient and the vitrification temperature of the glass.

A second raw glass material which has a lower refractive index is jetted out of the second burner nozzle 12, again with an argon carrier. This raw material gas is also $SiCl_4$, and a dopant gas $BBr_3$ is employed to decrease the refractive index.

The $SiCl_4$, $GeCl_4$, $POCl_3$ and $BBr_3$ are maintained in a liquid state in glass containers 31 through 35 as shown in FIG. 1; these liquids are bubbled by the argon carrier gas. The glass containers 31 through 35 are disposed in thermally controlled enclosures 41 through 45, respectively, and the amounts of raw glass material gases supplied are appropriately regulated by controlling the temperatures of the enclosures and the flow rates of the carrier gas. Heating means 46 are wound on the pipes connected between the outlets of the containers and the burner. The pipes are maintained at temperatures higher than the temperatures of the enclosures so that the gases passing through the pipes are not cooled and liquified.

Hydrogen and oxygen are jetted out of the fourth nozzle and fifth burner nozzles 14, 15, respectively, and argon is supplied through the third burner nozzle 13 to prevent the deposition of the synthesized glass particles on the nozzles. When the hydrogen gas is burned water is produced which reacts with the raw glass material gases, and glass soot particles 4 of $SiO_2$, $GeO_2$, $P_2O_5$ and $B_2O_3$ are thus synthesized by hydrolysis. The glass particles are sprayed onto the bottom of a rotary refractory start member 3, such as a quartz glass rod, to form soot-like glass deposits thereon. If the raw glass materials are continuously supplied the particles grow in an axial direction, as a result of which a soot-like glass rod 2 is formed. In depositing the glass particles, the start member 3 is continuously raised in accordance with the growth rate of the rod such that the distance between the glass deposition surface 5 of the rod and the tip of the burner is maintained constant. This maintains the outside diameter of the rod 2 substantially constant. Part of the first raw material jetted from nozzle 11 is mixed with part of the second raw material jetted from nozzle 12, whereby the dopant concentration is gradually changed in a radial direction to produce a graded index type of preform. If the degree of mixing is suitably controlled it is possible to obtain a substantially parabolic refractive index distribution, as developed below.

If it is assumed that the general concentration distribution of $SiCl_4$ is maintained substantially uniform by the gases from the nozzles 11 and 12, and the diffusion of the dopant from nozzle 12 is effected through a supply from two parallel planes, then the dopant concentration distributions due to the gases supplied from nozzles 11 and 12 can be expressed by the following equations:

$$C_1(r) = \frac{C_{10}}{2D_1 t_1} \exp(-r^2/4 D_1 t_1) \int_0^a \exp(r'^2/4 D_1 t_1) I_0\left(\frac{rr'}{2D_1 t_1}\right) r' dr'$$

(the dopant concentration distribution due to the gas supplied from nozzle 11), and $$C_2(r) = \frac{1}{2} C_{20}\left\{ erf\frac{(a + h + b - r)}{2\sqrt{D_2 t_2}} + erf\frac{r - (a + h)}{2\sqrt{D_2 t_2}} \right\}$$

(the dopant concentration distribution due to the gas supplied from nozzle 12),
wherein:
r is the distance from the center axis of the burner,
a is the radius of the nozzle,
b is the width of the nozzle 12,
h is the thickness of the partition between the nozzles 11 and 12, and
$D_i$, $t_i$, $C_{i0}$ (i=1 or 2) are the diffusion coefficients, the diffusion times, and the initial concentrations of the dopants of nozzles 11 and 12, respectively.

Figure 3:
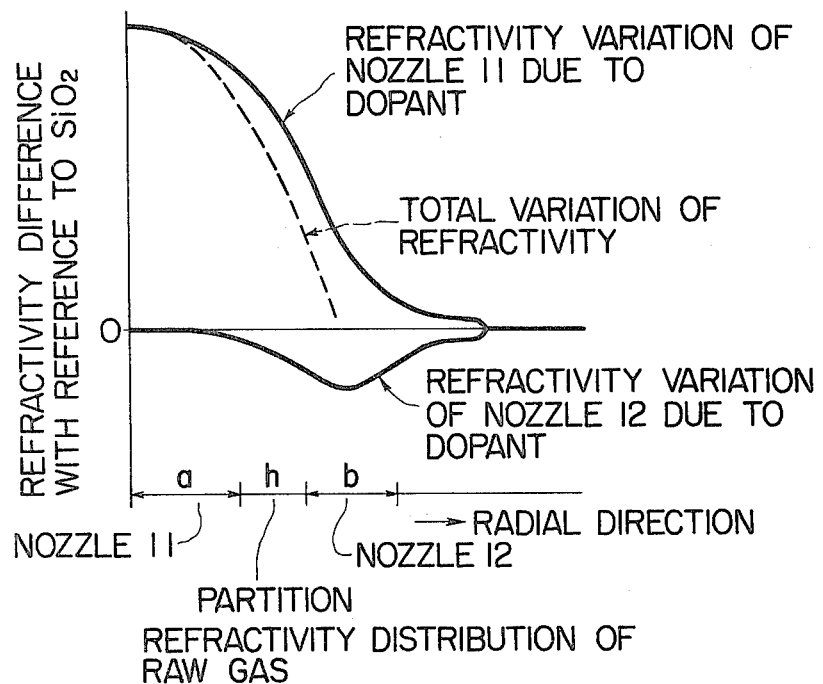
FIG. 3 shows refractive index curves for a preform made in accordance with the present invention.

In practice, the dopant concentration is substantially proportional to the refractive index variation. Accordingly, the contributions of the supply gases of nozzles 11 and 12 are as indicated by the solid lines and the foreseen general refractive index distribution is as indicated by the broken line in FIG. 3. Thus, if the burner's dimensions, the raw material composition, and the supply rates are suitably selected, it is possible to achieve a substantially parabolic refractive index distribution.

In the above example argon is used as the carrier gas; however, it may be other inert gas such as helium. Oxygen or nitrogen can also be used. Further, the gas fed from nozzle 13 to prevent the deposition of glass particles on the burner may be nitrogen or helium instead of argon. The dopant gas fed from nozzle 11 is also not limited to $GeCl_4$ or $POCl_3$, and may instead be at least one of halogen compounds or hydrogen compound of germanium, phosphorus, titanium and gallium. In addition, the dopant gas fed from nozzle 12 is not limited to $BBr_3$, and may instead be a gas containing boron or fluorine, for instance at least one of $BCl_3$, $SiF_4$, $CF_4$ and $CCl_2F_2$.

In the above description $SiCl_4$ is employed as the raw glass material to synthesize $SiO_2$; however, it may be replaced by a monosilane gas ($SH_4$) or a silane halogenide gas such as $SiHCl_3$. Inflammable gases containing hydrogen such as $CH_3$ and $C_2H_5$ may also be used instead of hydrogen gas for combustion. In principle it is unnecessary to rotate the start member; in practice, however, it is recommended that the start member be turned to eliminate any circumferential non-uniformity of the lamina which may be caused by the eccentricity of the burner nozzles or by flickering flames.

In the above example the burner has two raw glass material jetting nozzles; however, it may be replaced by a burner having three or more nozzles or pipes. All that is necessary is to arrange the concentration of dopants such that the refractive index is gradually decreased from the central nozzle to the outermost nozzle.

If it is required to get a preform of step index type, it is necessary to prevent any mixture between the first and second raw glasses.

This may be achieved by feeding the second gas through the third nozzle 13 and by supplying the inert gas through the second nozzle 12 in order to separate the two gases.

The soot-like glass rod thus formed is heated in a furnace to render it transparent. The heating temperature is preferably 1400° C.–1600° C.

The reason for the employment of the two steps of forming the soot-like glass rod and of sintering the latter to render it transparent, instead of forming the transparent glass rod directly from the raw gas, is that when, in laminating the fine particles of glass, if the temperature rises to the extent that the glass becomes tranparent, the dopant will be volatilized. This fact is also disclosed in U.S. Pat. No. 4,042,404. In the above example the glass is synthesized by flame hydrolysis because the glass yield of this method is better than that of other oxidation methods.

Figure 2:
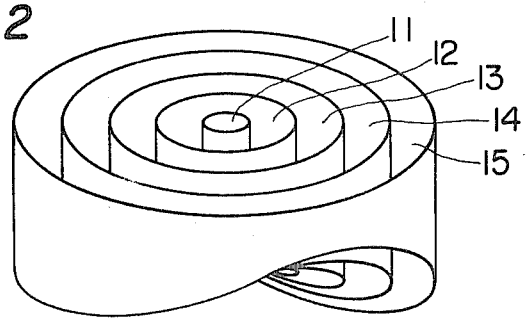
FIG. 2 shows a top perspective view of the tip of the burner in FIG. 1.

Concrete examples and their results in accordance with the present invention are described below, using the apparatus shown in FIGS. 1 and 2.

The $SiCl_4$, $GeCl_4$ and $POCl_3$ gases were fed from nozzle 11 while the $SiCl_3$ and $BBr_3$ gases were fed from nozzle 12, using an argon carrier, and argon was also supplied from the nozzle 13. The flow rates of the gases and the temperatures of the enclosures 41 through 45 were as indicated in Tables 1 and 2, respectively.

Table 1

| | Gas Flow Rate | | | | Nozzle | |
|---|---|---|---|---|---|---|
| Nozzle | Nozzle 11 | | | Nozzle 12 | | 13 | 14 | 15 |
| Gas | $SiCl_4$ | $GeCl_4$ | $POCl_3$ | $SiCl_4$ | $BBr_3$ | Ar | $H_2$ | $O_2$ |
| Flow Rate | 120 cc/min | 60 cc/min | 40 cc/min | 30 cc/min | 30 cc/min | 1 l/min | 4 l/min | 5 l/min |

Table 2

| | Temperature of Enclosure | | | | |
|---|---|---|---|---|---|
| Enclosure | 41 | 42 | 43 | 44 | 45 |
| Temperature (°C.) | 35 | 40 | 50 | 35 | 50 |

Figure 4:
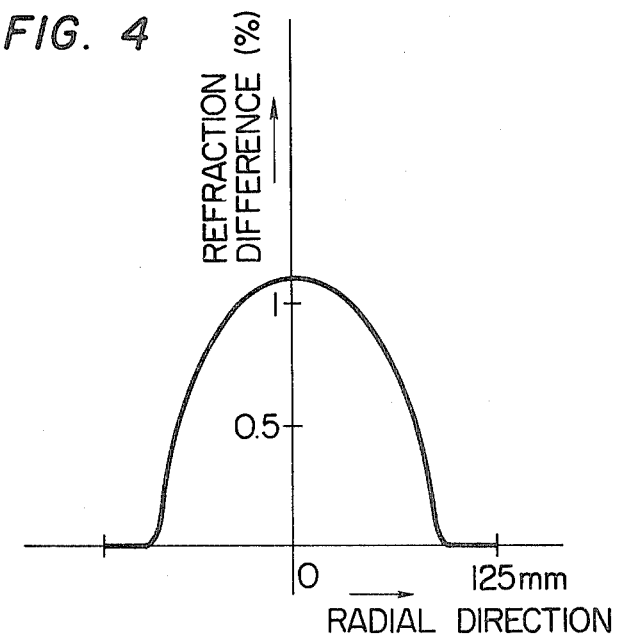
FIG. 4 shows a refractive index distribution curve for the preform.
Figure 6:
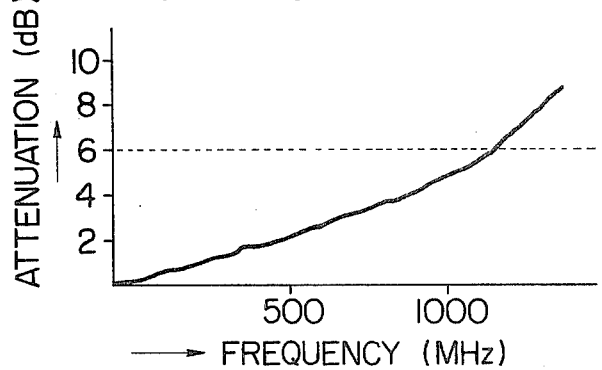
FIG. 6 shows a plot of base attenuation per Km vs. frequency for the fiber.
Figure 5:
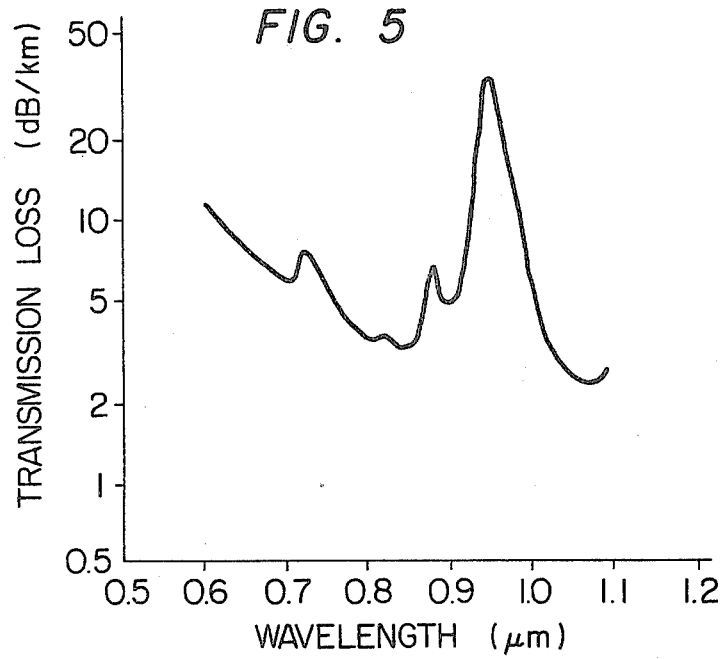
FIG. 5 shows a plot of transmission loss vs. wavelength for a fiber drawn from the preform.

Under the conditions described a soot-like glass rod 2 was grown at a rate of about 70 mm/hour, and after three hours a rod 50 mm in diameter and 200 mm in length was obtained. A transparent glass rod 25 mm in diameter and 100 mm in length was then obtained by sintering the soot-like glass rod at a temperature of about 1450° C. The actual measured values of the refractive index of this rod in a radial direction are plotted in FIG. 4, wherein the curve is seen to approximate a parabola. This preform was drawn into a fiber 2 Km in length, and the transmission characteristics thereof was measured. The transmission loss as a function of wavelength is plotted in FIG. 5. The attenuation value at a wavelength of 0.85 μm was very low—3.2 dB/Km. The base band frequency attenuation per Km is plotted in FIG. 6. The frequency at which the transmission loss is reduced by 6 dB is 1,100 MHz, and the fiber therefore has a very wide fequency band.

The inventors also prepared a soot-like glass rod and drew it into a fiber using two burners in accordance with U.S. Pat. No. 4,135,901. In this case the transmission band was on the order of 100 MHz/Km, which is less than one tenth the transmission band width according to this invention.

Since the number of kinds of gases to be fed can be reduced in this invention the apparatus can be readily controlled, and therefore a fiber having excellent characteristics can be provided with high reproducibility.

The method according to this invention forms the light propagating region of an optical fiber. A surrounding structural or protective sheath where light propagation is not effected may be formed by using an additional burner, or by inserting the preform in a circular cylinder or tube and drawing them into a continuous, elongated fiber.

What is claimed is:

1. A method of manufacturing a glass preform having a circular cross section and a predetermined radial refractive index distribution, from which an optical communication fiber may be drawn, comprising the steps of:
   (a) disposing a start member in spaced axial alignment with a burner tip including a plurality of concentric nozzles,
   (b) rotating said start member,
   (c) blowing a first gaseous raw glass material having a first dopant concentration which increases the index of refraction of the resulting glass through a central nozzle of said burner tip and toward said start member,
   (d) blowing a second gaseous raw glass material having a second dopant concentration which decreases the index of refraction of the resulting glass through a first concentric nozzle of said burner tip surrounding said central nozzle and toward said start member, (e) blowing an inflammable gas including hydrogen and oxygen through outer concentric nozzles of said burner tip surrounding said first concentric nozzle, whereby soot-like glass particles are synthesized proximate said burner tip through flame hydrolysis by burning said inflammable gas and deposit on the end of said start member, (f) withdrawing said start member from said burner tip to maintain a substantially constant spacing therebetween, whereby a soot-like glass rod having a circular cross-section is grown on said start member having a predetermined radial dopant concentration distribution, and (g) heating said soot-like glass rod to render it to be a transparent glass preform having a predetermined radial refractive index distribution.

2. A method as defined in claim 1, further comprising blowing an inert gas through an intermediate concentric nozzle disposed between the central and first concentric nozzles, to thereby produce a graded or stepped refractive index distribution.

3. A method as defined in claim 1, wherein the predetermined radial refractive index distribution is parabolic, and further comprising blowing an inert gas through a second concentric nozzle of said burner tip disposed between the first concentric nozzle and the outer concentric nozzles, whereby said inert gas forms an annular shield to prevent the disposition of glass particles on the burner tip.

4. A method as defined in claim 3, wherein the first and second gaseous raw glass materials are borne by a carrier gas selected from the group consisting of argon, helium, oxygen and nitrogen.

5. A method of manufacturing an optical communication fiber from a preform made in accordance with the method of claims 1, 3 or 4, comprising the steps of:
(a) heating the soot-like glass rod at a high temperature to render it transparent, and
(b) drawing the molten rod into a continuous, elongated fiber.

6. A method as defined in claims 1, 3 or 4, further comprising the step of forming a protective sheath surrounding said soot-like glass rod by using an additional burner.

7. A method as defined in claims 1, 3 or 4, further comprising the step of:
inserting said glass preform into a circular cylinder or tube.

* * * * *